March 2, 1965     J. W. MEESE     3,171,199
BLADE TYPE PLASTIC TUBE CUTTER WITH BLADE GUIDING MEANS
Filed April 2, 1962
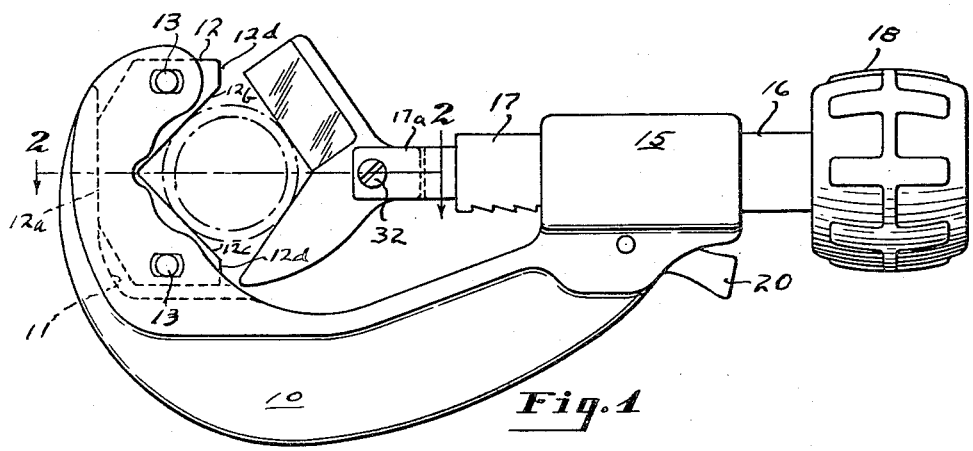
INVENTOR
John W. Meese
BY J. D. Douglas
his ATTORNEY

United States Patent Office 3,171,199
Patented Mar. 2, 1965

3,171,199
BLADE TYPE PLASTIC TUBE CUTTER WITH BLADE GUIDING MEANS
John W. Meese, Avon, Ohio, assignor to The Ridge Tool Company, Elyria, Ohio, a corporation of Ohio
Filed Apr. 2, 1962, Ser. No. 184,452
1 Claim. (Cl. 30—94)

This invention relates to cutters for cutting plastic, copper or other ductile tubing.

With the increase in use of plastic tubing for all purposes, it has become more desirable to provide a means for cutting that tubing. Heretofore it has been most common to cut the tubing with a knife or a saw. The use of a knife leaves edges that may be ragged and very seldom provides an edge that is square. A saw has a tendency for the teeth to become clogged, making frequent cleaning necessary, which is time-consuming. In both instances, it was difficult to hold the tube during the cutting operation. The softer varieties of plastic tubing were especially difficult to hold and cut accurately.

Although ordinary tube cutters of a design such as is shown in Patent No. 3,022,575, of February 27, 1962, have been used with some measure of success, there have been certain disadvantages attendant upon their use. One of the disadvantages was that the tube collapsed due to the pressure of the cutting blade and could not be cut easily. Another disadvantage was that it was difficult to cause the cutter wheel to run true around the tube and the cut was not a square cut but was skewed.

In the cutting of ductile tubing, such as copper, a disadvantage was realized from the use of conventional tube cutters in that the material was displaced adjacent to the cut to provide a ridge or burr at the ends of the cut portions. This required a separate deburring operation which was time-consuming and required extra tools. The burr had to be removed, otherwise the tube could not be inserted into the standard couplings usually used for making connections and joints.

By the present invention I have provided a tubing cutter which cuts quickly and smoothly. The resultant cut is a clean square cut without any ragged edges. The cutter is adjustable to cut a wide variety of sizes with a single tool. When used for copper tubing, the burr formed during the cutting is removed as the tube is being cut. The tool in either of its embodiments may be used by persons with a minimum of skill in the field.

Still other advantages of the invention and the invention itself will become more apparent from the following description of an embodiment thereof, which description is illustrated by the accompanying drawings and forms a part of this specification.

In the drawings:

FIG. 1 is an elevational view of a cutter arranged to cut plastic tubing;

FIG. 2 is a fragmentary section taken on the line 2—2 of FIG. 1;

FIG. 3 is a view of a cutter blade removed from the cutter;

FIG. 4 is a section on the line 4—4 of FIG. 3;

FIG. 5 is a view of a cutter for use in cutting and deburring copper tubing; and FIG. 6 is a section taken on the line 6—6 of FIG. 5.

Throughout the drawings like parts have been designated by like reference characters.

Briefly, the invention contemplates a cutter having a frame with tube support means disposed in one end of the frame and having a cutter blade carried by blade advancing means to advance the blade into contact with the tube and having guiding and/or deburring means operating in conjunction therewith to guide the blade and/or debur the tube. The cutter means is pivotally supported by the advancing means in order that the blade may move ahead of the guiding or deburring means.

More specifically the tube cutter includes a generally C shaped frame 10, one end of which is provided with a recess 11 in which there is disposed a V block 12. The V block 12 is of generally rectangular shape and fits closely within the recess 11 where it is held by a pair of pins 13. Preferably the block is provided with a square bottom face 12a which seats against the bottom of the recess. So far as this block is concerned, the only requirements are, other than the supporting faces, that it fits snugly within the recess preferably without movement.

The block is provided with a pair of tube engaging faces 12b and 12c which extend at an angle of 90° to each other with the apex of the angle in line with the axis of the cutter advancing means and with the axis of the cutter advancing means bisecting the angle. As best shown in FIG. 2, the faces 12b and 12c of the V block, as well as the marginal portion 12d, are bisected by a slot 14. The purpose of the slot is to allow passage of the cutter blade and guide into the slot when cutting small tubing.

At the other end of the frame there is provided a hollow boss 15 in which is slidably disposed a square stem 16 of the cutter advancing mechanism. The stem 16 in turn houses the cutter support 17 and the cutter support is advanced and retracted by turning a knob 18 disposed on the end of the stem 16. The means for advancing and retracting the cutter is not of my invention and may be, and preferably is, the same as that of the before mentioned Patent 3,022,575. Other means of a similar nature are well known to those versed in the art. The particular means shown, however, has the advantage that a ratchet means controlled by a latch lever 20 enables a coarse adjustment of the cutter blade to be quickly made with respect to the tubing being cut.

The cutter blade assembly includes a cutter portion for cutting into the tubing and a guiding or deburring portion for engagement with the surface of the tubing. In both instances, the guiding and deburring portion guides the blade so that a square cut is always made.

As shown in FIGS. 1 to 4 inclusive, the blade assembly includes a shank 30, of generally rectangular formation, formed with an aperture 31, which shank is received and pinned in the bifurcated end 17a of the support 17 by a threaded shoulder pin 32. It will be noted that the shank 30 does not bottom in the bottom of the slot 17b, but that a space exists between the end of the shank and the bottom end of the seat which allows limited pivoting movement of the shank and hence the blade within the slot.

The blade unit comprises a pair of divergent arms. The arm 30a comprises a knife blade and the arm 30b comprises a tube engaging arm. The knife blade is provided with a sharp edge 30c which is preferably a straight cutting edge. The tube engaging arm is provided with a flat tube engaging face 30d of generally rectangular formation. The manner of its operation is as follows:

A tube T to be cut is seated in the V block with its circumference in tangential contact with the faces 12b–12c. The cutter support is advanced by the ratchet until both the knife edge 30c and the guide face 30d have tangential engagement with the periphery of the tube on the opposite side of the tube from the V block. Then the cutter assembly is advanced by turning the knob 18. At the same time the frame is rotated around the tube being cut. The cutter blade 30c may cut into the tube but the tube engaging face 30d cannot, and therefore the cutter blade may be held squarely to the work and tube engaging face guides it in a cutting plane normal to the axis of the work which in turn is held squarely in the frame by the guiding or back-up V block 12. This condition is maintained throughout the cutting operation because the guide face 30d is wide enough to extend on both sides of the cut and as the cutter blade goes into the material the entire blade assembly may tilt about the pin 32, whereby the cutting blade partakes of a counter-clockwise movement into the work while the guide surface maintains a tangential engagement with the surface of the work albeit there is a slight shifting of the point of tangency on the surface 30d. When work of a smaller diameter is being cut, the slots 14 in the V block enable the blade parts 30a and 30d to telescope therein without disturbing the cutting relation as described. The blade does not have to be straight. The guide means preferably engages the tube on opposite sides of the cut but could be extended to one side only.

FIGS. 5 and 6 show the invention as applied to a cutter for cutting copper or similar tubing. In this instance, the arm 30f is bifurcated and receives between the walls, in the slot 30g, a cutter wheel 50 which is rotatably mounted on a pin 51. The other arm 30k is provided with a series of teeth 55 which have sharp edges 56. The teeth may be shaped as shown having perpendicular parts 56a and slanting back walls 56b.

The cutter is used in the same way as described for cutting plastic tubing. In this instance, however, it is desirable to rotate the cutter around the tube in a counter-clockwise direction so that the burr may be more effectively shaved off by the teeth shaped as illustrated. Suffice to say that as the tube is cut and a burr thrown up it is immediately shaved off by the teeth 56. The ability of the assembly to tilt also allows the blade 50 to penetrate the wall of the tube while the teeth 56 remain in engagement with the surface.

It will be apparent therefore that I have provided an improved invention in tubing cutters, which is useful in cutting both plastic and metal tubing and that inexperienced persons may provide clean effective square cuts with a minimum of effort and skill.

Having thus described the invention in some embodiments thereof, I am aware that numerous and extensive departures may be made therefrom without departing from the spirit or scope of the invention as defined by the appended claim.

I claim:

A tube cutter, comprising an elongate frame, a tube support means carried by one end of the frame and having a V-shaped recess facing the opposite end of the frame and for supporting a tube therein transversely of the frame, a tube cutting and guide means, an elongate longitudinally movable member supported on said other end of the frame having a forward end directed toward said V-shaped recess, carrying said cutting and guide means for advancing a tube toward said tube support means, said cutting and guide means consisting of an integral structure of substantially V-form with a shank projecting from the apex of the V and pivotally attached to said forward end of said longitudinally movable member and with one of the arms of the V carrying a cutter having the cutting edge directed toward said tube support means and the other arm forming the guide means.

References Cited in the file of this patent

UNITED STATES PATENTS

| | | |
|---|---|---|
| 717,800 | Bell | Jan. 6, 1903 |
| 833,035 | Forster | Oct. 9, 1906 |
| 1,728,504 | Nonneman | Sept. 17, 1929 |
| 2,752,676 | Trickle | July 3, 1956 |
| 2,802,259 | Stoner | Aug. 13, 1957 |

FOREIGN PATENTS

| | | |
|---|---|---|
| 218,231 | Australia | Aug. 28, 1958 |